Aug. 5, 1958  F. T. WADSWORTH  2,845,950
APPARATUS FOR METERING SMALL FLOWS OF LIQUIDS
Filed Feb. 28, 1956

INVENTOR.
Francis T. Wadsworth
BY
Everett A. Johnson
ATTORNEY

United States Patent Office 2,845,950
Patented Aug. 5, 1958

2,845,950

APPARATUS FOR METERING SMALL FLOWS OF LIQUIDS

Francis T. Wadsworth, Dickinson, Tex., assignor to The American Oil Company, Texas City, Tex., a corporation of Texas Application February 28, 1956, Serial No. 568,212

7 Claims. (Cl. 137—154)

This invention relates to an improved type of apparatus for pumping desired small volumes of fluids and, more particularly, the invention relates to a laboratory apparatus for metering micro volumes of liquid at controlled flow rates.

The problem of metering small volumes of liquids frequently arises in conjunction with research activities. Flow rates are often required which cannot be provided by conventional pumping equipment and it has heretofore been necessary to employ either very complicated mechanisms or makeshift devices which are not readily adaptable to accurate control.

It is, therefore, a primary object of my invention to provide means for accurately measuring and discharging predetermined volumes of liquid at controlled rates. A further object of the invention is to provide apparatus of the positive displacement type which is foolproof in operation and which is of simple construction. An additional object of the invention is to provide an improved system wherein micro samples of fluids can be introduced over a substantially long period of time into a reservoir under controlled pumping conditions. These and other objects of my invention will become apparent as the description thereof proceeds.

Briefly, I attain the objects of my invention of accurately metering small volumes of liquids by employing a primary pump which transfers a much larger volume of liquid than is required. The reduction ratio between the large volume of liquid handled by the primary pump and the small volume of liquid to be delivered is accomplished by using one or more intervening immiscible displacement liquids. Each reduction stage comprises a receiving vessel of large diameter, within the last of which is located a liquid-sealed pump barrel or tube of selected size which contains the fluid to be transferred and delivered.

Further details and advantages of the invention will be described by reference to the accompanying diagrammatic drawings wherein.

Figures 1, 2, 3:
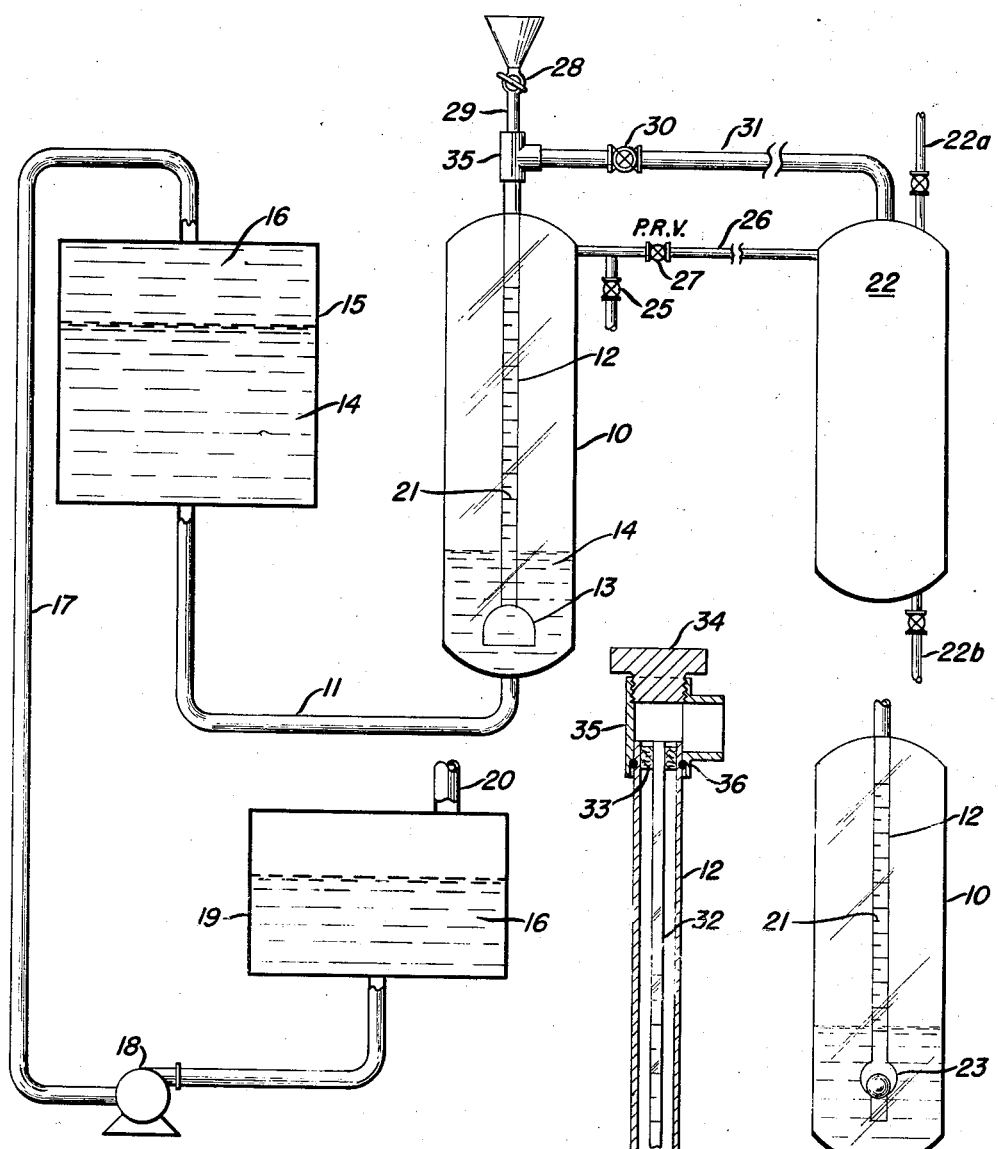
Figure 1 is a diagrammatic elevation, partly in cross section, showing one form of the apparatus.
Figure 2 is a diagrammatic elevation, also partly in cross section, which illustrates another embodiment of the apparatus including a check valve at the inlet to the pumping barrel.
Figure 3 is an enlarged detail of a cartridge means for disposing the liquid to be transferred within the pump barrel.

Referring to the drawings, the pump cylinder 10 is provided with an inlet line 11 and a calibrated tube 12 extending through the upper wall of the cylinder 10 and having at its lower end a bell 13 which is maintained below the level of the displacing liquid 14 within the cylinder 10.

The displacing liquid 14 introduced by inlet line 11 is contained within closed reservoir 15 into which an immiscible pumping liquid 16 is supplied by conduit 17 from primary pump 18 and reservoir 19 having vent 20 open to the atmosphere.

Water or other suitable liquid 16 is metered by the primary pump 18 from the vented reservoir 19 through conduit 17 into closed chamber 15 from which it discharges the displacement liquid 14 through inlet 11 into the pump cylinder 10. The displacement liquid 14 may be mercury and as the liquid rises within the cylinder 10 the sample or charge stock is displaced from the smaller calibrated tube 12 having scale 21. By choosing a vessel 10 of proper diameter for the desired pumping rate, a wide range of transfer rates can be achieved by varying the diameter of the tube 12. It may be as small as capillary tubing thereby permitting extremely small flow rates of sample even though the primary pump 18 is handling a much larger volume of liquid 16.

If desired, several pump barrels 12 may be placed in a single vessel 10 permitting accurate control and discharge of a number of minute streams at different rates with a single primary pump 18. If placed at different depths, sequential discharge of the minute streams may be attained.

Variations in pressure on the downstream side of the tube 12 such as within the receiver 22 might tend to force the sample liquid from the lower end of the tube 12 and this tendency can be minimized by the use of either a ball check valve 23, as shown in Figure 2, or an expanded section or bell 13 at the base of the barrel 12, as shown in Figure 1. It will be apparent, however, that if the system is to be used at atmospheric pressure it is only necessary to vent the pump cylinder 10 via valved vent 25. If desired, vent 25 can be connected directly to the vent 20 on the reservoir 19 thereby providing a closed circuit which is pressure balanced and from which the small flows can be transferred. It is further contemplated that pressure can be equalized between the pumping cylinder 10 and the receiver 22 by line 26 having pressure relief valve 27.

In operating the described apparatus, the sample may be introduced into the tube 12 through the stopcock 28 at the top of feed line 29 after closing valve 30 in discharge line 31 leading to receiver 22. In order to displace a sample from the tube 12, the stopcock 28 is closed, valve 30 opened and the displacing liquid 14 transferred from chamber 15 into the pump cylinder 10 by the action of pump 18 on liquid 16 supplied to chamber 15.

The primary pump 18 transfers the displacing liquid 16 such as water from the reservoir 19 into the closed chamber 15 wherein it expels the displacement mercury 14. The volume of displacing liquid 14 is in ratio with the cross-sectional area of the pump cylinder 10 such that a small rise in the bottom level of sample within the tube 12 is accompanied by a relatively large change in the level of the displacement liquid 14. It will be apparent that the pumping of the larger amount of displacement liquid 14 allows for better control of the discharge of the liquid sample from tube 12.

Another means for loading the tube 12 sometimes referred to herein as a "pump barrel" is illustrated in Figure 3 wherein a capillary tube 32 containing the sample is secured within the pump barrel 12 by means of the elastic grommet 33. A threaded cap 34 seals a T extension 35 attached by O-ring 36 to the pump barrel 12, which extension is of such diameter as to admit the capillary tube 32 and the grommet 33. The fluid is displaced from the capillary 32 and discharged by a line 31 in a manner similar to that described in connection with Figure 1.

The apparatus illustrated in the drawings may be modified further by the inclusion of a system of check valves, etc. in the pressure equalizer line 26 and the discharge line 31 when high vapor pressures are encountered within the receiver 22. If desired, the pressure relief valve 27 to prevent undesirable continuous venting of the receiver 22 may be of the zero pressure differential type.

Although I have described my invention by reference to preferred embodiments thereof, it should be understood that these are by way of illustration only and that modifications can be made in the apparatus in view my description thereof without departing from the spirit and scope of my invention.

What I claim is:

1. A device for metering fluids comprising a chamber containing a heavy liquid, a calibrated tube of small diameter disposed within said chamber and having an open lower end below the level of heavy liquid therein, conduit means for supplying heavy liquid to said chamber, pump means on said conduit means, and a vent means from said chamber whereby the level of heavy liquid within said chamber can be increased to discharge liquid from said calibrated tube at a rate which is proportional to the ratio of cross-sectional flow area of said chamber and of said calibrated tube.

2. An apparatus for pumping small flows of a sample fluid at an accurately controlled rate which comprises in combination a first reservoir containing a heavy displacement liquid, a calibrated tube having an open lower end below the level of heavy liquid in said reservoir, said calibrated tube having a bell bottom and a valved inlet, a second reservoir containing a quantity of said heavy displacement liquid and having an inlet and outlet, the outlet being in fluid communication with a lower part of said first reservoir, a third reservoir open to the atmosphere and having an outlet conduit in fluid communication with the inlet to said second reservoir, a pumping means on said conduit extending between said second and third reservoirs, an immiscible pumping liquid in said third reservoir and adapted to be transferred into said second reservoir thereby to discharge the heavy displacement liquid from said second reservoir into said first vertically elongated reservoir containing said calibrated tube, and means for charging the sample fluid into said calibrated tube.

3. The apparatus of claim 2 wherein the means for charging the sample fluid comprises a conduit connected to the upper end of said calibrated tube, and a stopcock on said conduit.

4. The apparatus of claim 2 wherein the means for charging the sample fluid to the calibrated tube comprises a separable cartridge tube having an elastic grommet about its upper end and being adapted to be inserted into said calibrated tube, and a closure for the upper end of said calibrated tube whereby the sample may be displaced from the cartridge tube.

5. An apparatus for metering small flows of liquids which comprises a calibrated barrel adapted to contain the liquid to be metered, a first vessel into which said calibrated barrel depends with its open lower end adjacent the bottom thereof, a bell-shaped enlargement at the lower end of said calibrated barrel, a second reservoir having an inlet and an outlet, said second reservoir being disposed at a higher level than the bottom of said first vessel, conduit means extending between the outlet of said second reservoir and the base of said first vessel, a quantity of heavy liquid within said second reservoir and within the lower part of said first vessel, the level of heavy liquid in said first vessel being above the open end of said depending calibrated barrel therein, a third reservoir vented to the atmosphere and containing a volume of a second liquid immiscible with said first heavy liquid, an outlet from said third reservoir, conduit means extending between the outlet of said third reservoir and the inlet of said second reservoir, and pump means on said last mentioned conduit means adapted to transfer liquid from said third reservoir into said second reservoir thereby displacing heavy liquid from the second reservoir into said first vessel to effect the transfer of sample liquid from the calibrated barrel at a controlled low rate.

6. The apparatus of claim 5 wherein the calibrated barrel includes a removable inner capillary tube secured therein in fluid-tight relationship whereby the introduction of the displacement heavy liquid into the first vessel transfers liquid from the capillary tube in a controlled manner.

7. The device of claim 1 wherein said calibrated tube has a bell bottom and a valved inlet.

References Cited in the file of this patent

UNITED STATES PATENTS

| | | |
|---|---|---|
| 2,634,027 | Wyatt | Apr. 7, 1953 |
| 2,747,774 | Breitenbach | May 29, 1956 |